United States Patent
Whitefield et al.

(10) Patent No.: US 9,092,393 B2
(45) Date of Patent: Jul. 28, 2015

(54) DUAL MODE SERIAL/PARALLEL INTERFACE AND USE THEREOF IN IMPROVED WIRELESS DEVICES AND SWITCHING COMPONENTS

(75) Inventors: David Scott Whitefield, Andover, MA (US); Nuttapong Srirattana, Billerica, MA (US); Kevin F. Walsh, Salem, NH (US); Florinel G. Balteanu, Ottawa (CA)

(73) Assignee: Skyworks Solutions, Inc., Woburn, MA (US)

( * ) Notice: Subject to any disclaimer, the term of this patent is extended or adjusted under 35 U.S.C. 154(b) by 267 days.

(21) Appl. No.: 13/416,952

(22) Filed: Mar. 9, 2012

(65) Prior Publication Data

US 2012/0233374 A1 Sep. 13, 2012

Related U.S. Application Data

(60) Provisional application No. 61/452,040, filed on Mar. 11, 2011.

(51) Int. Cl.
  *G06F 13/20* (2006.01)
  *G06F 13/38* (2006.01)
  *G06F 13/40* (2006.01)

(52) U.S. Cl.
  CPC .............. *G06F 13/20* (2013.01); *G06F 13/38* (2013.01); *G06F 13/40* (2013.01); *G06F 13/4068* (2013.01); *Y02B 60/1228* (2013.01); *Y02B 60/1235* (2013.01)

(58) Field of Classification Search
  CPC ......... G06F 13/20; G06F 13/38; G06F 13/40; G06F 13/4068; Y02B 60/1228; Y02B 60/1235
  USPC ................................ 710/62, 71, 105–106, 316
  See application file for complete search history.

(56) References Cited

U.S. PATENT DOCUMENTS 5,724,554 A * 3/1998 Gish ................................ 710/11
6,845,420 B2   1/2005 Resnick (Continued)

FOREIGN PATENT DOCUMENTS

EP         0332554 B1 * 9/1989 ................ G06F 3/12

OTHER PUBLICATIONS

Lin, Charles C. "What's a Tri-state Buffer?". 2003. Retrieved from Internet Jan. 27, 2014. <http://www.cs.umd.edu/class/sum2003/cmsc311/Notes?CompOrg/tristate.html>.*

(Continued)

*Primary Examiner* — Thomas J Cleary
(74) *Attorney, Agent, or Firm* — Knobbe, Martens, Olson & Bear, LLP (57) ABSTRACT

Systems, methods, and devices for communicating with a serial/parallel interface are described herein. In an aspect, a wireless device includes a transceiver configured to output a plurality of transmission paths, and an antenna configured to output a signal corresponding to at least one of the transmission paths. The wireless device further includes a wireless switching component including a radio-frequency switch configured to selectively connect the antenna to one of the transmission paths, a plurality of signal pins, a serial interface including a plurality of serial inputs electrically coupled to at least one pin of the plurality of signal pins, a parallel interface including a plurality of parallel inputs electrically coupled to at least one pin of the plurality of signal pins, a decoder, and a level shifter configured to control the radio-frequency switch, the at least one pin electrically coupled to both a serial input and a parallel input.

22 Claims, 8 Drawing Sheets

(56) References Cited

U.S. PATENT DOCUMENTS

| | | |
|---|---|---|
| 7,283,794 B2 | 10/2007 | Molnar et al. |
| 7,397,717 B2 | 7/2008 | Chen et al. |
| 7,533,202 B2 | 5/2009 | Newman |
| 2003/0065863 A1* | 4/2003 | Wyland .................. 710/305 |
| 2003/0090939 A1* | 5/2003 | Perroni et al. ........... 365/185.09 |
| 2004/0239442 A1* | 12/2004 | Wilcox .................. 333/126 |
| 2005/0113035 A1* | 5/2005 | Kyongyop O ............ 455/90.3 |
| 2006/0038710 A1* | 2/2006 | Staszewski et al. ......... 341/143 |
| 2006/0067123 A1* | 3/2006 | Jigour et al. ............. 365/185.05 |
| 2007/0146005 A1* | 6/2007 | Sauber et al. ............ 326/37 |
| 2011/0021245 A1* | 1/2011 | Taniuchi ................ 455/552.1 |
| 2011/0187417 A1* | 8/2011 | Kim et al. .............. 327/109 |

OTHER PUBLICATIONS

International Search Report for International Application PCT/US2012/028628 mailed Oct. 29, 2012.

* cited by examiner

| PIN NAME | FUNCTION |
| --- | --- |
| VIO | ENABLE /MIPI VIO |
| V4 | PARALLEL CONTROL 4/MIPI SDATA |
| V3 | PARALLEL CONTROL 3/MIPI SCLK |
| V2 | PARALLEL CONTROL 2 |
| V1 | PARALLEL CONTROL 1 |

FIG.7

| PARALLEL | VIO=0 | V4 | V3 | V2 | V1 |
| --- | --- | --- | --- | --- | --- |
| MIPI CTRL MODE | VIO=1 | D3 | D2 | D1 | D0 |
| DISABLE | | 0 | 0 | 0 | 0 |
| GSM_LB_Tx | | 0 | 0 | 0 | 1 |
| GSM_HB_Tx | | 0 | 0 | 1 | 0 |
| ISOLATION | | 0 | 0 | 1 | 1 |
| TRx1 | | 0 | 1 | 0 | 0 |
| TRx2 | | 0 | 1 | 0 | 1 |
| TRx3 | | 0 | 1 | 1 | 0 |
| ISOLATION | | 0 | 1 | 1 | 1 |
| TRx4 | | 1 | 0 | 0 | 0 |
| TRx5 | | 1 | 0 | 0 | 1 |
| TRx6 | | 1 | 0 | 1 | 0 |
| ISOLATION | | 1 | 0 | 1 | 1 |
| Rx1 | | 1 | 1 | 0 | 0 |
| Rx2 | | 1 | 1 | 0 | 1 |
| ISOLATION | | 1 | 1 | 1 | 0 |
| ISOLATION | | 1 | 1 | 1 | 1 |

FIG.8

DUAL MODE SERIAL/PARALLEL INTERFACE AND USE THEREOF IN IMPROVED WIRELESS DEVICES AND SWITCHING COMPONENTS

CROSS-REFERENCE TO RELATED APPLICATIONS

This application claims the benefit of priority under 35 U.S.C. §119(e) of U.S. Provisional Patent Application No. 61/452,040, entitled "DUAL MODE SERIAL/PARALLEL INTERFACE," filed Mar. 11, 2011, which is hereby incorporated herein by reference in its entirety to be considered part of this specification.

BACKGROUND

1. Field

Embodiments of the invention relate to electronic systems, and in particular, to serial and parallel interfaces for electronic systems.

2. Description of the Related Technology

Various electronic systems, such as mixed-signal electronic systems, can include an interface for writing data to and/or reading data from one or more integrated circuits (ICs). The interface can include either a serial interface or a parallel interface. For example, a radio frequency system can include a serial peripheral interface (SPI) bus for writing and reading registers of an RF switch or digital attenuator. As an alternative example, a radio frequency system can implement a parallel general purpose I/O (GPIO) interface. Another alternative interface is the Mobile Industry Processor Interface (MIPI/SPI). The registers can include information for setting, for example, a power mode and/or a frequency band of operation of a power amplifier.

A radio frequency system with a serial interface can include specialized interface circuitry. Therefore, a radio frequency system implementing a serial interface typically has a different physical hardware design from a radio frequency system implementing a parallel interface. Accordingly, if a system designer wishes to provide customers a choice of interface, it may produce multiple product versions, each implementing different interfaces. There are significant costs associated with this approach, such as the need for additional semiconductor processing masks, inventory management, additional development costs, schedule delays, etc. Once the designer decides which interface to provide, the hardware is designed with either one of the above interfaces. Typically, the interfaces cannot be interchanged, because each interface has different inputs and protocols. Often, the interface requirement is changed after the design is complete. Sometimes, different customers require different interfaces.

Alternatively, the system designer could implement both serial and parallel interfaces in the same product. This approach typically requires additional pins and duplication of interface circuitry, further complicating manufacture and packaging. Accordingly, a conventional implementation of dual interfaces also carries significant costs.

There is a need products with the flexibility to be used in diverse interface environments. Furthermore, there is a need for a flexible interface that has reduced development costs through a single multipurpose design, and which requires fewer pins.

SUMMARY

In certain embodiments, the present disclosure relates to a dual interface device. The dual interface device can comprise a plurality of signal pins, a serial interface, and a parallel interface. The serial interface can include a plurality of serial inputs, which can be electrically coupled to at least one pin of the plurality of signal pins. The parallel interface can include a plurality of parallel inputs, which can be electrically coupled to at least one pin of the plurality of signal pins. The at least one pin can be electrically coupled to both a serial input and a parallel input.

In an embodiment, at least two pins of the plurality of signal pins can be electrically coupled to both a serial input and a parallel input.

In another embodiment, the dual interface device can be configured such that that only one of the serial interface and the parallel interface is enabled at one time. The serial interface and the parallel interface can be configured to enter a high-impedance state when not enabled.

In another embodiment, the dual interface device can further comprise a serial enable pin. The serial enable pin can be configured to enable the serial interface and to disable the parallel interface when active. The serial enable pin can be configured to disable the serial interface and to enable the parallel interface when non-active.

In an embodiment, the parallel interface can include at least one parallel input not electrically coupled to a signal pin. Furthermore, the signal pins can include package pins. The parallel interface can include an enabling input configured to enable the parallel interface only when electrically coupled to a non-active signal. The enabling input can be electrically coupled to an active signal.

In an embodiment, the serial interface can include an input configured to enable the serial interface only when electrically coupled to an active signal. The enabling input can be electrically coupled to a non-active signal.

In various embodiments, the dual interface device can further comprise a controller and a bus. The bus can electrically connect an output of the serial interface, an output of the parallel interface, and an input of the controller. The parallel interface can include a tri-state buffer, which can be configured to buffer the parallel inputs to the bus when enabled.

In an embodiment, the dual interface device can further comprise an inverter. The inverter can be configured to receive a serial enable signal and to output a parallel disable signal. The parallel disable signal can be configured to disable the parallel interface when active.

In various embodiments, the serial interface can be configured to implement a serial peripheral interface (SPI). The serial inputs can include a serial enable input, a serial data input, and a serial clock input. The serial interface can be configured to implement a mobile industry processor interface (MIPI/SPI). The parallel interface can be configured to implement a parallel general purpose input-output (GPIO) interface. In certain embodiments, the present disclosure relates to a wireless device. The wireless device can comprise a plurality of signal pins, a serial interface, a parallel interface, a decoder, and a level shifter. The serial interface can include a plurality of serial inputs electrically coupled to at least one pin of the plurality of signal pins. The parallel interface can include a plurality of parallel inputs electrically coupled to at least one pin of the plurality of signal pins. The at least one pin can be electrically coupled to both a serial input and a parallel input. The level shifter can be configured to control a radio-frequency switch.

In certain embodiments, the present disclosure relates to a wireless switching component. The wireless switching component can comprise a plurality of signal pins. The wireless switching component can further comprise a serial interface. The serial interface can include a plurality of serial inputs electrically coupled to at least one pin of the plurality of signal pins. The wireless switching component can further comprise a parallel interface. The parallel interface can include a plurality of parallel inputs electrically coupled to at least one pin of the plurality of signal pins. The wireless switching component can further comprise a decoder. The wireless switching component can further comprise a level shifter. The at least one pin can be electrically coupled to both a serial input and a parallel input. The level shifter can be configured to control a radio-frequency switch.

In an embodiment, the wireless switching component can be configured such that that only one of the serial interface and the parallel interface is enabled at one time. At least two pins of the plurality of signal pins can be electrically coupled to both a serial input and a parallel input.

In certain embodiments, the present disclosure relates to a wireless device. The wireless device can comprise a transceiver configured to output a plurality of transmission paths. The wireless device can further comprise an antenna. The wireless device can further comprise a wireless switching component. The wireless switching component can comprise a radio-frequency switch configured to selectively connect the antenna to one of the transmission paths. The wireless switching component can further comprise a plurality of signal pins. The wireless switching component can further comprise a serial interface. The serial interface can include a plurality of serial inputs electrically coupled to at least one pin of the plurality of signal pins. The wireless switching component can further comprise a parallel interface. The parallel interface can include a plurality of parallel inputs electrically coupled to at least one pin of the plurality of signal pins. The wireless switching component can further comprise a decoder. The wireless switching component can further comprise a level shifter configured to control the radio-frequency switch. The at least one pin can be electrically coupled to both a serial input and a parallel input.

In an embodiment, the wireless device can be configured such that that only one of the serial interface and the parallel interface is enabled at one time. At least two pins of the plurality of signal pins can be electrically coupled to both a serial input and a parallel input.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF EMBODIMENTS

The headings provided herein, if any, are for convenience only and do not necessarily affect the scope or meaning of the claimed invention.

Provided herein are various non-limiting examples of devices and methods for use with serial interfaces.

Figure 1:
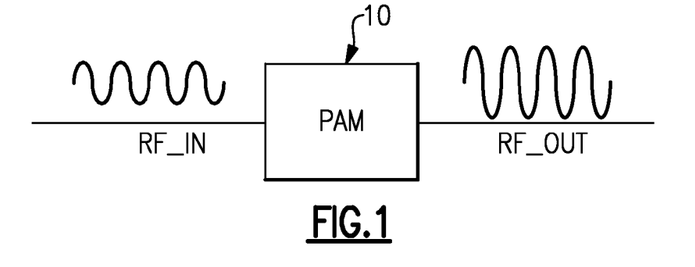
FIG. 1 is a schematic diagram of a power amplifier module for amplifying a radio frequency (RF) signal.

FIG. 1 is a schematic diagram of a power amplifier module for amplifying a radio frequency (RF) signal. The illustrated power amplifier module (PAM) 10 can be configured to amplify an RF signal IN to generate an amplified RF signal OUT. As described herein, the power amplifier module can include one or more power amplifiers.

RF power amplifiers can be used to boost the power of a RF signal having a relatively low power. Thereafter, the boosted RF signal can be used for a variety of purposes, included driving the antenna of a transmitter.

Power amplifiers can be included in mobile phones to amplify a RF signal for transmission. For example, in mobile phones having a time division multiple access (TDMA) architecture, such as those found in Global System for Mobile Communications (GSM), code division multiple access (CDMA), and wideband code division multiple access (W-CDMA) systems, a power amplifier can be used to amplify a RF signal. It can be important to manage the amplification of a RF signal, as a desired transmitted power level can depend on how far the user is away from a base station and/or the mobile environment. Power amplifiers can also be employed to aid in regulating the power level of the RF signal over time, so as to prevent signal interference from transmission during an assigned receive time slot.

The power consumption of a power amplifier can be an important consideration. One technique for reducing power consumption of a power amplifier is envelope tracking, in which the voltage level of the power supply of the power amplifier is varied in relation to the envelope of the RF signal. Thus, when the envelope of the RF signal increases, the voltage supplied to the power amplifier can be increased. Likewise, when the envelope of the RF signal decreases, the voltage supplied to the power amplifier can be decreased to reduce power consumption.

Figure 2:
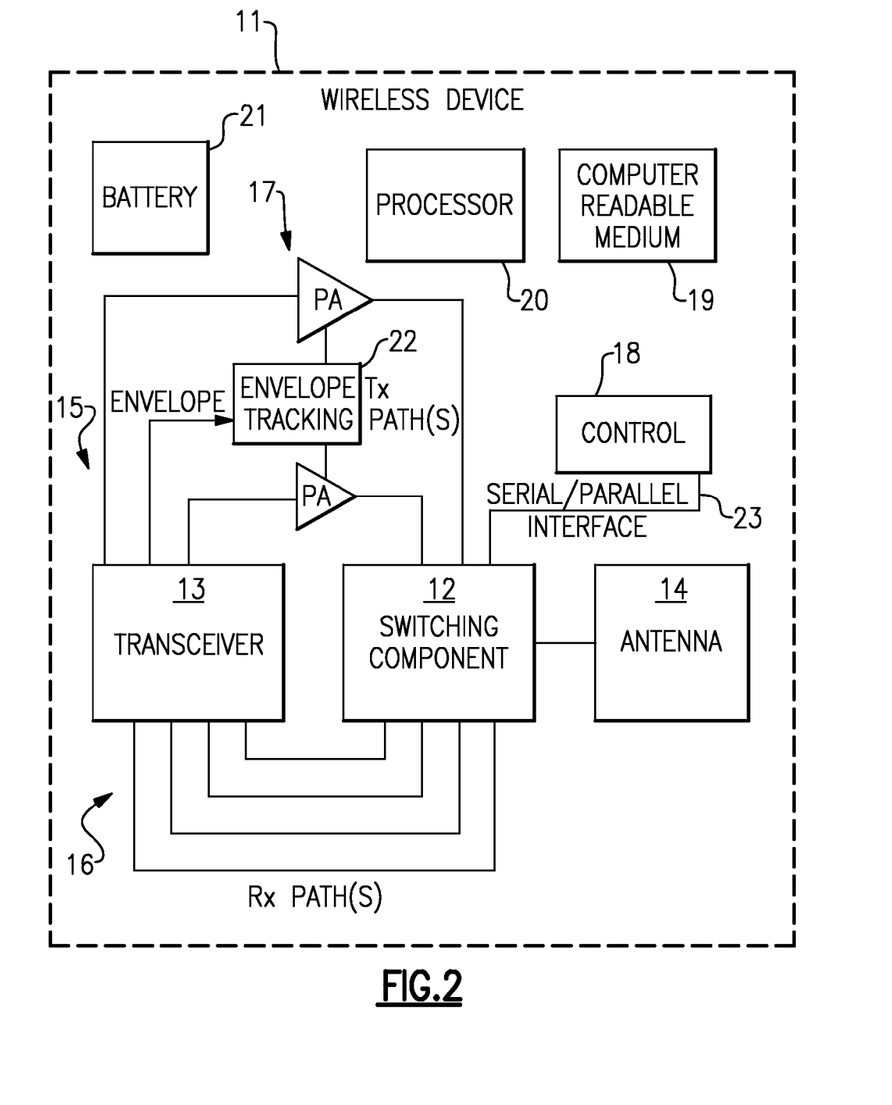
FIG. 2 is a schematic block diagram of an example wireless device that can include one or more of the power amplifier modules of FIG. 1.

FIG. 2 is a schematic block diagram of an example wireless device 11 that can include one or more of the power amplifier modules of FIG. 1. The wireless device 11 can include dual serial/parallel interfaces implementing one or more features of the present disclosure.

The example wireless device 11 depicted in FIG. 2 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain WCDMA and Long Term Evolution (LTE) devices can operate over, for example, about 22 radio frequency spectrum bands.

One or more features of the present disclosure can be implemented in the foregoing example modes and/or bands, and in other communication standards. For example, 3G and 4G are non-limiting examples of such standards.

In certain embodiments, the wireless device 11 can include a switching component 12, a transceiver component 13, an antenna 14, power amplifiers 17, a control component 18, a computer readable medium 19, a processor 20, a battery 21, an envelope tracking block 22, and a serial or parallel data bus 23.

The transceiver component 13 can generate RF signals for transmission via the antenna 14. Furthermore, the transceiver component 13 can receive incoming RF signals from the antenna 14.

It will be understood that various functionalities associated with the transmission and receiving of RF signals can be achieved by one or more components that are collectively represented in FIG. 2 as the transceiver 13. For example, a single component can be configured to provide both transmitting and receiving functionalities. In another example, transmitting and receiving functionalities can be provided by separate components.

Similarly, it will be understood that various antenna functionalities associated with the transmission and receiving of RF signals can be achieved by one or more components that are collectively represented in FIG. 1B as the antenna 14. For example, a single antenna can be configured to provide both transmitting and receiving functionalities. In another example, transmitting and receiving functionalities can be provided by separate antennas. In yet another example, different bands associated with the wireless device 11 can be provided with one or more antennas.

In FIG. 2, one or more output signals from the transceiver 13 are depicted as being provided to the antenna 14 via one or more transmission paths 15. In the example shown, different transmission paths 15 can represent output paths associated with different bands and/or different power outputs. For example, two example power amplifiers 17 shown can represent amplifications associated with different power output configurations (e.g., low power output and high power output), and/or amplifications associated with different bands.

In FIG. 2, one or more detected signals from the antenna 14 are depicted as being provided to the transceiver 13 via one or more receiving paths 16. In the example shown, different receiving paths 16 can represent paths associated with different bands. For example, the four example paths 16 shown can represent quad-band capability that some wireless devices are provided with.

To facilitate switching between receive and transmit paths, the switching component 12 can be configured to electrically connect the antenna 14 to a selected transmit or receive path. Thus, the switching component 12 can provide a number of switching functionalities associated with an operation of the wireless device 11. In certain embodiments, the switching component 12 can include a number of switches configured to provide functionalities associated with, for example, switching between different bands, switching between different power modes, switching between transmission and receiving modes, or some combination thereof. The switching component 12 can also be configured to provide additional functionality, including filtering of signals. For example, the switching component can be a front-end module for a transceiver, and can include one or more duplexers. The switching component 12 can include a serial or parallel interface, as will be described herein.

FIG. 2 shows that in certain embodiments, a control component 18 can be provided, and such a component can be configured to provide various control functionalities associated with operations of the switching component 12, the power amplifiers 17, the envelope tracking block 22, and/or other operating component(s). For example, the control component 18 can provide instructions to the switching component 12 via the serial or parallel data bus 23.

In certain embodiments, a processor 20 can be configured to facilitate implementation of various processes described herein. In an embodiment, the processor 20 can include a serial or parallel interface, as will be described herein. For the purpose of description, embodiments of the present disclosure may also be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

In certain embodiments, these computer program instructions may also be stored in a computer-readable memory 19 that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide steps for implementing the acts specified in the flowchart and/or block diagram block or blocks.

The illustrated wireless device 11 also includes the envelope tracking block 22, which can be used to provide a power supply to one or more of the power amplifiers 17. For example, the enveloping tracking block 22 can vary the supply voltage provided to the power amplifiers 17 based upon an envelope of the RF signal to be amplified.

The envelope tracking block 22 can be electrically connected to a battery 21, and the envelope tracking block 22 can be configured to vary the voltage provided to the power amplifiers 17 based on an envelope of the RF signal to be amplified. The battery 21 can be any suitable battery for use in the wireless device 11, including, for example, a lithium-ion battery. By varying the voltage provided to the power amplifiers, the power consumption of the battery 21 can be reduced, thereby improving performance of the wireless device 11. The envelope signal can be provided to the envelope tracking block 22 from the transceiver 13. However, the envelope can be determined in other ways. For example, the envelope can be determined by detecting the envelope from the RF signal using any suitable envelope detector.

Figure 3A:
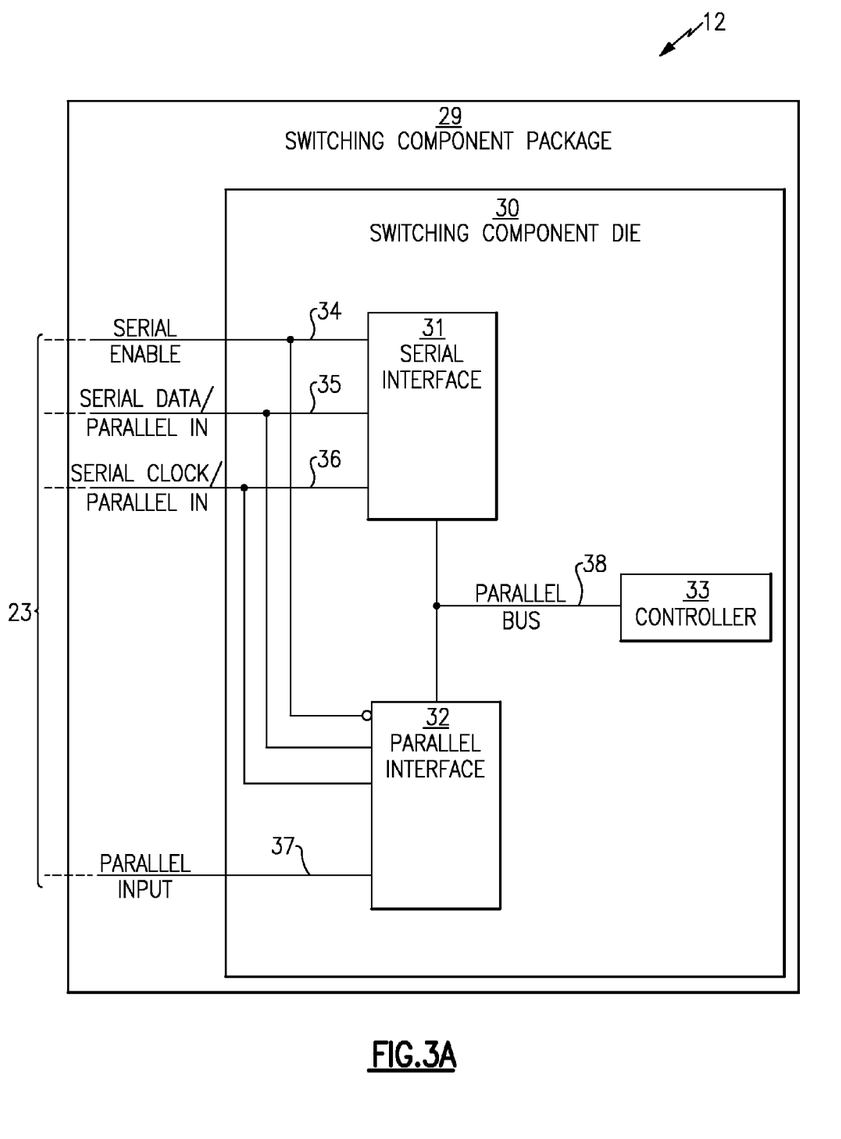
FIG. 3A is a schematic block diagram of a switching component, according to an embodiment.

FIG. 3A is a schematic block diagram of a switching component 12, according to an embodiment. The illustrated switching component 12 includes a package 29 and a die 30. The die 30 can be a silicon microchip or the like. The package 29 can be configured to encase and protect the die 30, and can provide pin access to one or more inputs and outputs of the die 30. As described above with respect to FIG. 2, the switching component 12 can receive signals (for example, from the control component 18), via the parallel/serial interface bus 23. As shown, the parallel/serial interface bus 23 can be configured as either a parallel or serial bus, depending on how the inputs 34-37 are connected external to the package 29.

The die 30 includes a serial interface 31, a parallel interface 32, and a controller 33. The serial interface 31 can be configured to implement, for example, a serial peripheral interface (SPI). The illustrated serial interface 31 receives input from a serial enable input 34, a serial data input 35, and a serial clock input 36. The serial enable input 34 can indicate to the serial interface 31 that the serial data input 35 and the serial clock input 36 are in use. When the serial enable input 34 is active, the serial interface 31 can convert serial data received via the serial data input 35 into parallel data, which the serial interface 31 can convert to parallel data and transmit over a parallel data bus 37. As will be described in greater detail herein, in certain embodiments, the serial data input 35 can also be configured as a parallel data input. Similarly, the serial clock input 36 can also be configured as a parallel data input.

The parallel data bus 37 can include one or more parallel inputs, and can carry the parallel data to the controller 33. The parallel data bus 37 can be configured to carry parallel data according to, for example, a parallel GPIO interface. When the serial enable input 34 is not active, the serial interface 31 can enter a high-impedance output mode, wherein the serial interface 31 does not drive the parallel data bus 37. Persons having ordinary skill in the art will appreciate that other serial data transfer interfaces can be implemented by the serial interface 31, using more or fewer interface pins.

The parallel interface 32 can be configured to implement, for example, a parallel GPIO interface. The illustrated parallel interface 32 receives input from the serial enable input 34, the serial data input 35, the serial clock input 36, and a parallel data pin 38. More than one parallel data pin 38 can be included. The parallel interface 43 can be configured as a tri-state buffer. When the serial enable pin is not active, the parallel interface 43 can receive signals from the from the parallel input 35, the parallel input 36, and the parallel input 37, and replicate those signals on the parallel data bus 38.

When the serial enable input 34 is active, the parallel interface 32 can enter a high-impedance output mode, wherein the parallel interface 32 does not drive the parallel data bus 37. Accordingly, the serial data/parallel input 35 and the serial clock/parallel input 36 can be multi-purpose pins, which can be used as serial interface pins when the serial enable input 34 is active, or as parallel interface pins when the serial enable input 34 is not active. Persons having ordinary skill in the art will appreciate that other parallel data transfer interfaces can be implemented by the parallel interface 32, using greater or fewer interface pins.

The controller 33 can be any component with which a user might want to communicate over a serial or parallel interface. In the illustrated embodiment, the controller 33 is configured to receive data via the parallel bus 38. In other embodiments, the controller 33 can be configured to receive data via a different method. Although unidirectional communication is described herein, persons having ordinary skill in the art will appreciate that serial and parallel data transfer interfaces can be implemented using bidirectional interfaces.

As illustrated, the serial interface 31 and the parallel interface 32 are provided to the switching component 12 of FIG. 2. In various other embodiments, the serial interface 31 and the parallel interface 32 can be provided to any other component. For example, the invention described herein can be incorporated into any component with which communication is desirable such as, for example, the processor 20 (FIG. 2), and the control 18.

When implemented on a semiconductor integrated circuit (IC), the switching component die 30, may be able to achieve one or more of the following advantageous features, among others. First, development and manufacturing cost can be reduced. Because one system can communicate over both serial and parallel interfaces, there is no need to design and create two single-interface systems. Second, development time can be reduced. Because no redesign and tape-out is required when a different interface is needed, one design can satisfy two application modes. Third, the switching component die 30 is more flexible than single-interface systems. This additional flexibility is very cost-effective because the switching component die 30 requires minimal die area, power consumption, and design demands.

Furthermore, the number of pins in the switching component die 30 can be further reduced while preserving some of the potential advantages described above. The general design of the switching component die 30 can be used to create two different single-interface systems without significantly increasing the manufacturing and design cost. As described below with respect to FIGS. 3B and 3C, the design of the switching component die 30 can be used in the production of switching component package 29 configured to operate in either a serial communication mode (see FIG. 3B) or a parallel communication mode (see FIG. 3C).

Figure 3B:
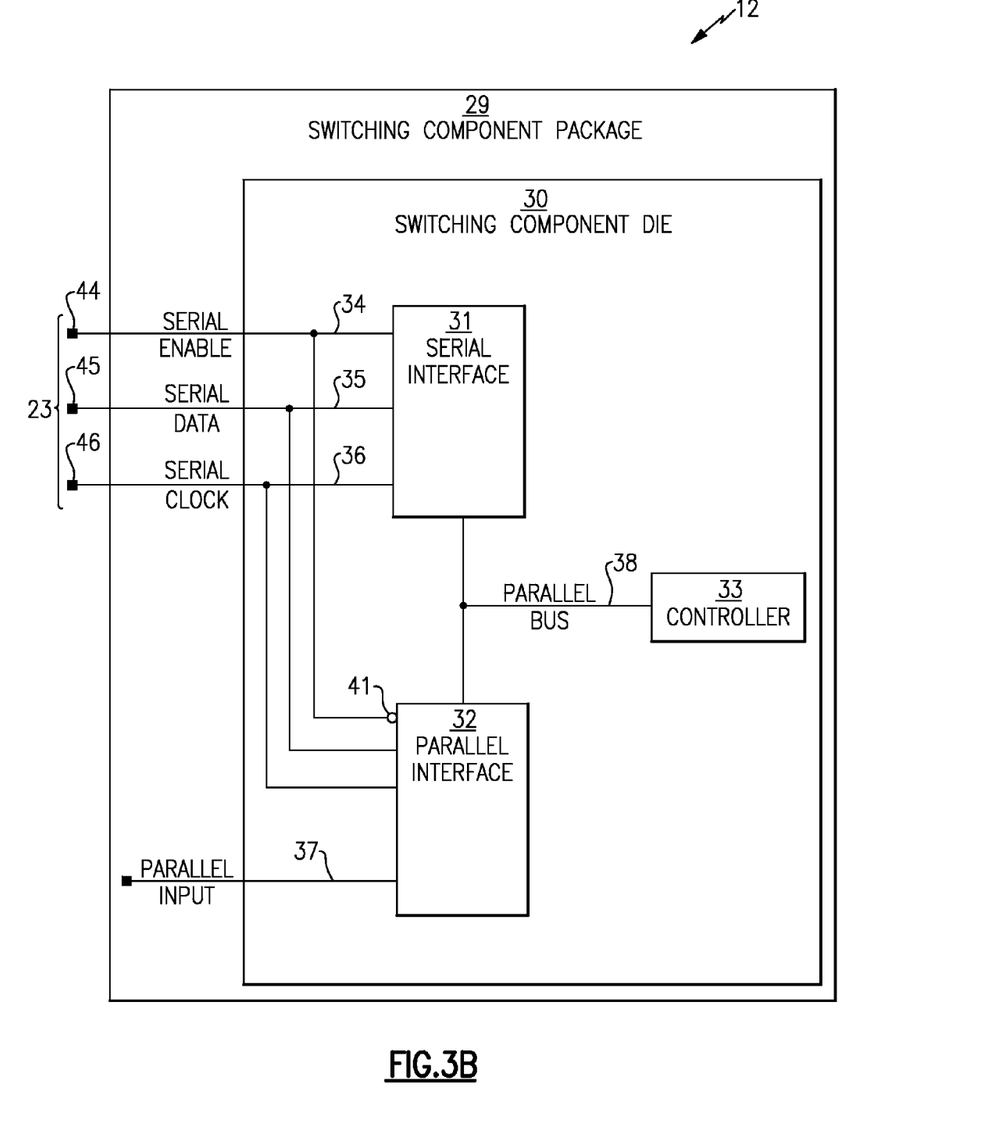
FIG. 3B is a schematic block diagram of the switching component, according to another embodiment.

FIG. 3B is a schematic block diagram of the switching component 12, according to another embodiment. In the embodiment of FIG. 3B, the switching component 12 is configured to communicate via the serial interface 31. The illustrated switching component 12 includes a package 29 and a die 30. The die 30 can be a silicon microchip or the like. The package 29 can be configured to encase and protect the die 30, and can provide pin access to one or more inputs and outputs of the die 30. As described above with respect to FIG. 2, the switching component 12 can receive signals (for example, from the control component 18), via the parallel/serial interface bus 23. As shown, the parallel/serial interface bus 23 is configured as a serial bus connected to the switching component 12 via the serial interface 31.

The illustrated die 30 includes the serial interface 31, the parallel interface 32, and the controller 33 of FIG. 3A. As in FIG. 3A, the serial interface 31 can be configured to implement, for example, a serial peripheral interface (SPI). In the illustrated embodiment, the input 34 is configured as a serial enable input, which is bonded to an external pin 44 of the switching component package 29. The input 35 is configured as a serial data input, which is bonded to an external pin 45 of the switching component package 29. The input 36 is configured as a serial clock input, which is bonded to an external pin 46 of the switching component package 29.

The illustrated serial interface 31 receives input from the serial enable input 34, the serial data input 35, and the serial clock input 36. The serial enable input 34 can indicate to the serial interface 31 that the serial data input 35 and the serial clock input 36 are in use. The serial interface 31 can convert serial data received via the serial data input 35 into parallel data, which the serial interface 31 can transmit over a parallel data bus 38. The parallel data bus 38 can carry the parallel data to the controller 33. The parallel data bus 38 can be configured to carry parallel data according to, for example, a parallel GPIO interface.

In the illustrated embodiment, the parallel input 37 is not bonded to any external pins of the switching component package 29. Furthermore, the serial enable input 34 is connected to a parallel disable input 41. Accordingly, when the serial enable input 34 is active, the parallel interface is disabled. In another embodiment, the parallel disable input 41 can be tied to a voltage source representing logic-one. The parallel disable input 41 can be tied to the voltage source via a pull-up resistor. In various embodiments, the parallel interface 32 can include a parallel enable input 41, and the logic connections can be reversed as appropriate.

Although the switching component package 29 does not include an external pin corresponding to the parallel input 37, the switching component die 30 may be implemented on an IC die that does include a contact corresponding to the parallel input 37. When the IC die is packaged, the manufacturer can leave the contact corresponding to parallel input 37 disconnected. Similarly, the parallel disable input 41 on the parallel interface 32 can be driven active at the die level. This arrangement can advantageously allow the same IC die to be used in the switching component package 29 configured to use either a serial interface (see FIG. 3B) or a parallel interface (see FIG. 3C). The differences between the two systems can be accomplished entirely in packaging. For example, in an embodiment, the switching component package 29 can be created by bridging the parallel disable input 41 of the parallel interface 32 with the serial enable input 34 at the packaging level. The switching component package 29 can be configured to use parallel communications in a similar manner, as discussed below with respect to FIG. 3C.

Figure 3C:
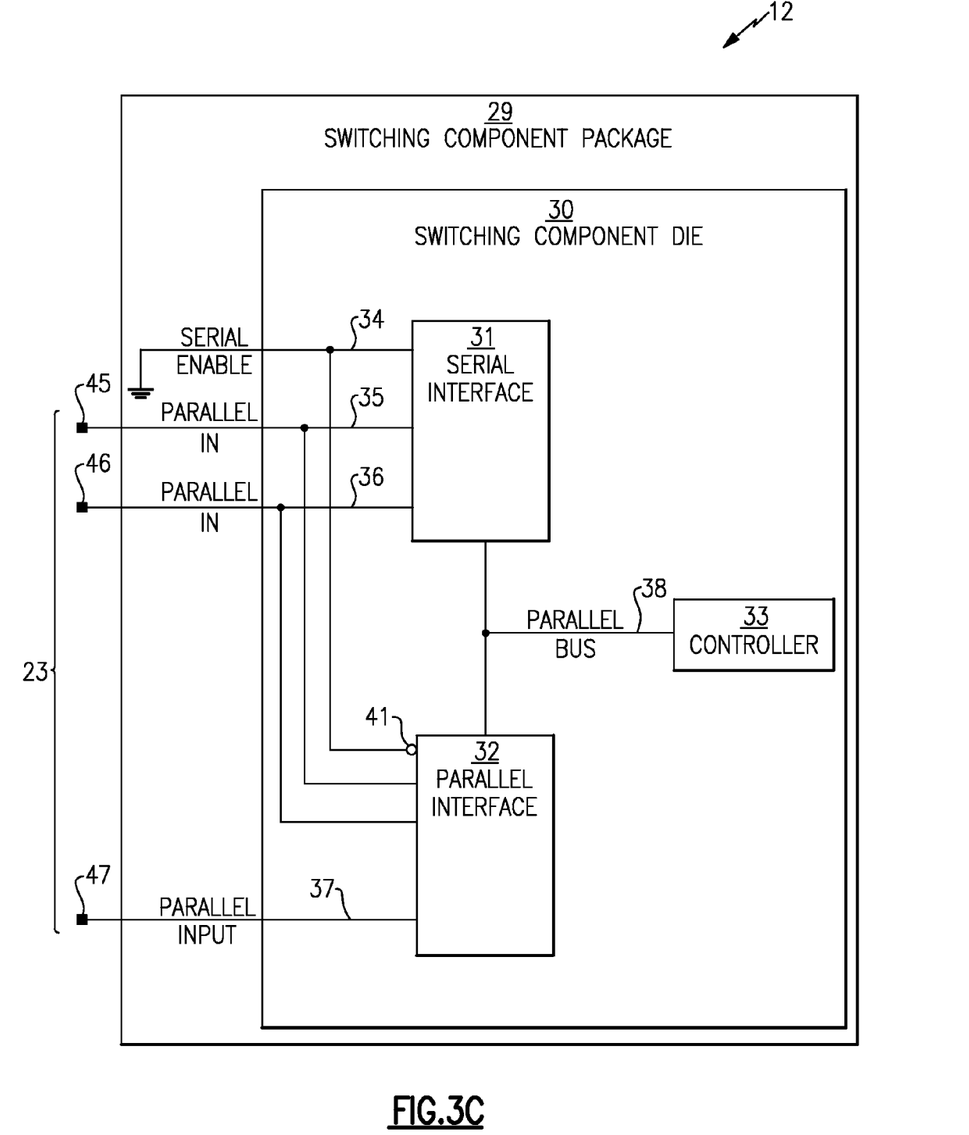
FIG. 3C is a schematic block diagram of the switching component, according to another embodiment.

FIG. 3C is a schematic block diagram of the switching component 12, according to another embodiment. In the embodiment of FIG. 3C, the switching component 12 is configured to communicate via the parallel interface 32. The illustrated switching component 12 includes a package 29 and a die 30. The die 30 can be a silicon microchip or the like. The package 29 can be configured to encase and protect the die 30, and can provide pin access to one or more inputs and outputs of the die 30. As described above with respect to FIG. 2, the switching component 12 can receive signals (for example, from the control component 18), via the parallel/serial interface bus 23. As shown, the parallel/serial interface bus 23 is configured as a parallel bus connected to the switching component 12 via the serial interface 31.

The die 30 includes the serial interface 31, the parallel interface 32, and the controller 33 of FIG. 3A. As in FIG. 3A, the parallel interface 32 can be configured to implement, for example, a parallel GPIO interface. The input 35 is configured as a parallel data input, which is bonded to the external pin 45 of the switching component package 29. The input 36 is configured as a parallel data input, which is bonded to the external pin 46 of the switching component package 29. The one or more pins of the parallel data input 37 are bonded to one or more external pins 47 of the switching component package 29.

The illustrated parallel interface 32 receives input from the parallel inputs 35, 36, and 37 through the external pins 45, 46, and 47, respectively. The parallel interface 32 can be configured as a tri-state buffer. The parallel interface 32 can receive signals from the parallel inputs 35, 36, and 37 and replicate those signals on the parallel data bus 38. The parallel data bus 38 can carry the parallel data to the controller 33. The parallel data bus 38 can be configured to carry parallel data according to, for example, a parallel GPIO interface.

Unlike the switching component package 29 illustrated in FIG. 3B, the switching component package 29 illustrated in FIG. 3C does not include an external serial enable input 34. Instead, the input 34 is configured as the parallel disable input 41, and is tied to a voltage source representing logic-zero. In an embodiment, the input 41 can be tied directly to ground, or tied to ground via a pull-down resistor. In another embodiment, the parallel interface 32 can be provided with a parallel enable input 41, and the logic connections can be reversed accordingly.

Although the switching component package 29 does not include an external pin corresponding to the serial enable input 34, the switching component die 30 may be implemented on an IC die that does include a contact corresponding to the serial enable input 34. When the IC die is packaged, the manufacturer can leave the contact corresponding to the serial enable input 34 disconnected or tied to logic-zero. Similarly, the parallel disable input 41 on the parallel interface 32 can be driven non-active at the die level. This arrangement can advantageously allow the same IC die to be used in the switching component package 29 configured to use either a serial interface (see FIG. 3B) or a parallel interface (see FIG. 3C). The differences between the three systems can be accomplished entirely in packaging. Alternatively, the differences between switching component die 30, the serial system 40, and the parallel system 50 can be accomplished via a late fabrication stage metal layer change, post fabrication modification, and the like.

Figure 4:
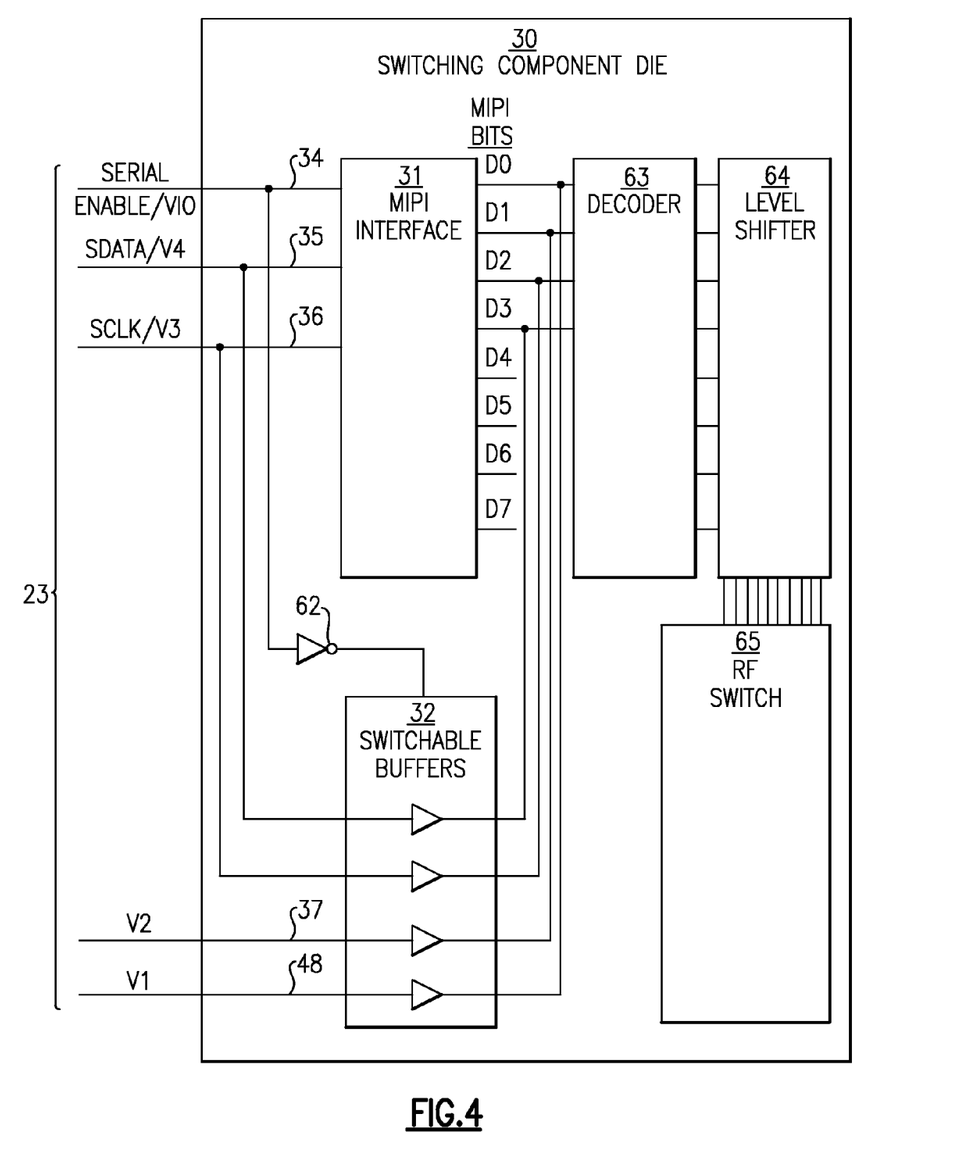
FIG. 4 is a schematic block diagram of a switching component die, according to an embodiment.

FIG. 4 is a schematic block diagram of the switching component die 30, according to an embodiment. The illustrated switching component die 30 includes a Mobile Industry Processor Interface (MIPI/SPI) 31, parallel switchable buffers 32, an inverter 62, a decoder 63, a level shifter 64, and an RF switch 65. The level shifter 64 can provide control functions to the RF switch 65, which can include one or more switching transistors. The switching component die 30 can receive signals (for example, from the control component 18), via the parallel/serial interface bus 23. As shown, the parallel/serial interface bus 23 can be configured as either a parallel or serial bus, depending on how the inputs 34-37 and 48 are connected external to the die 30.

The illustrated switching component die 30 can receive signals VDD, Enable/VIO, V4/SDATA, V3/SCLK, V2, and V1, which can correspond to inputs 34, 35, 36, 37, and 48 (see FIGS. 3A-C). VDD can be a voltage reference configured to power the decoder 63 and the level shifter 64. The Enable/VIO signal can act as either a serial enable signal (Enable) or a MIPI/SPI VIO signal (VIO). The V4/SDATA signal can act as either a parallel control signal (V4) or a serial data signal (SDATA). The V3/SCLK signal can act as either a parallel control signal (V3) or a serial clock signal (SCLK). V2 and V1 can be parallel control signals.

The illustrated MIPI/SPI interface 31 receives the Enable, SDATA, and SCLK signals as input. The Enable signal can indicate to the MIPI/SPI interface 31 that the V4/SDATA signal represents serial data (SDATA), and that the V3/SCLK signal represents a serial clock (SCLK). When the MIPI/SPI interface 31 receives an active Enable signal, the MIPI/SPI interface 31 can convert serial data received via the serial data input SDATA into parallel control signals D0 through D7. The illustrated MIPI/SPI interface 31 transmits only parallel control signals D0 though D3 to the decoder 63, a person having ordinary skill in the art will appreciate that other configurations are possible, depending on the control scheme.

The parallel switchable buffers 32 can be configured to implement, for example, a parallel control scheme such as that described below with respect to FIG. 8. The parallel switchable buffers 32 can receive an inverter Enable/VIO signal through the inverter 62. The parallel switchable buffers 32 can be a tri-state buffer configured to buffer the parallel control signals V1 through V4 when the Enable signal is non-active, and to enter a high-impedance mode when the Enable signal is active. When the illustrated parallel switchable buffers 32 are in the high-impedance mode, it does not drive the decoder. When the Enable signal is not-active, the parallel switchable buffers 32 can output the parallel control signals V1 through V4 as parallel control signals D0 through D3. Additional parallel control signals V5 through VN can be included. Furthermore, the parallel control signal V4 can be omitted.

The parallel control signals D0 through D3 can represent a parallel control bus carrying control signals to the decoder 63 and the level shifter 64. The decoder 63 can decode the parallel control signals D0 through D3 into a plurality of level shifter control signals. The level shifter 64 can receive the control signals from the decoder 63, level shift the control signals, and drive RF transistors such as an RF switch.

Figure 5:
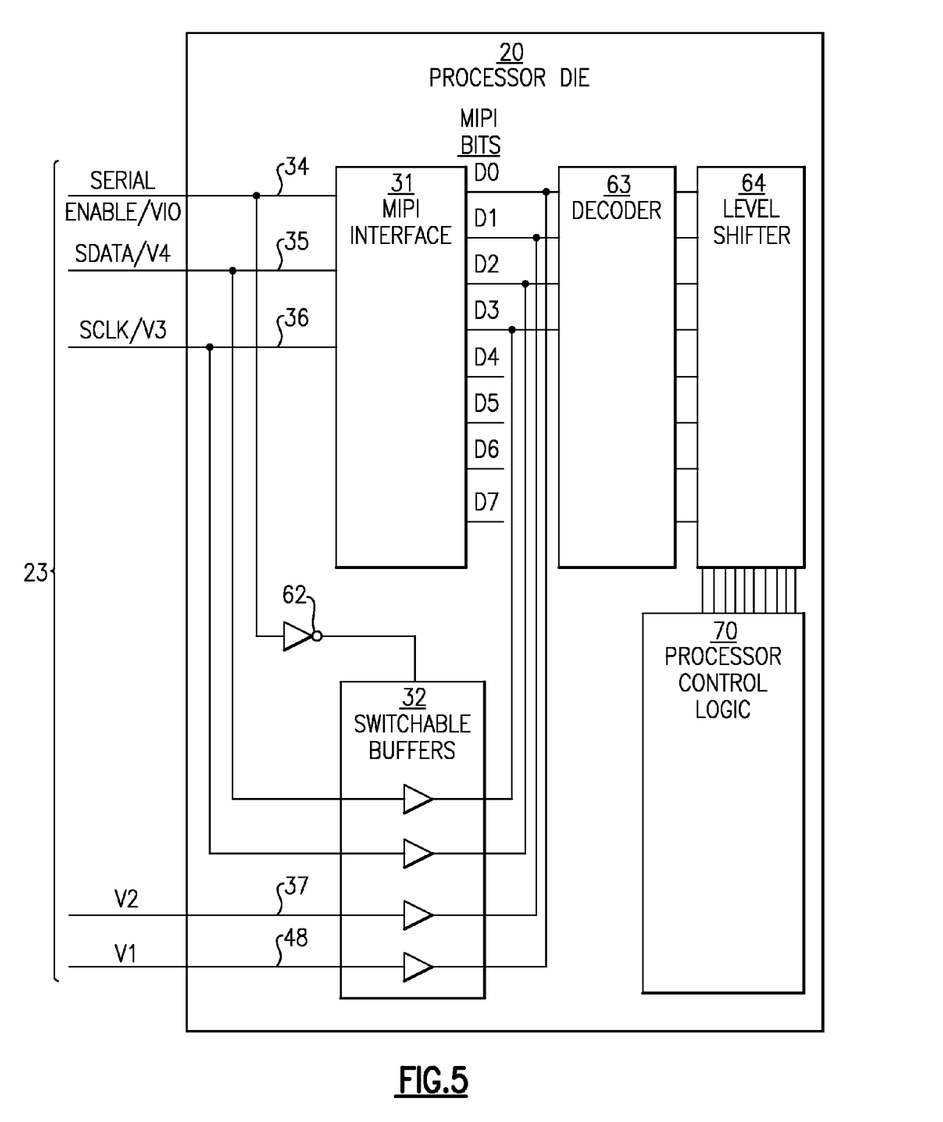
FIG. 5 is a schematic block diagram of a processor die, according to an embodiment.

FIG. 5 is a schematic block diagram of the processor die 20, according to an embodiment. As discussed above, the dual-mode serial interface 31 and parallel interface 32 can be provided to other components of the wireless device 11. In the illustrated embodiment, the processor die 20 includes a Mobile Industry Processor Interface (MIPI/SPI) 31, parallel switchable buffers 32, an inverter 62, a decoder 63, a level shifter 64, and processor control logic 70. The level shifter 64 can provide serial or parallel data, received externally, to the processor control logic 70. The processor control logic 70 can be any processor module that might receive data. As an alternative or additional embodiment to that shown in FIG. 2, the processor die 20 of FIG. 5 can receive signals via the parallel/serial interface bus 23. In other words, the processor die 20 can communicate, via the parallel/serial interface bus 23, with any other component. For example, the processor die 20 can receive, via the bus 23, from the control component 18, the computer readable medium 19, a programming module (not shown), a test module (not shown), etc. In another embodiment, the processor die 20 can communicate via a parallel/serial interface bus separate from the bus 23. As shown, the parallel/serial interface bus 23 can be configured as either a parallel or serial bus, depending on how the inputs 34-37 and 48 are connected external to the processor die 20.

Figure 6:
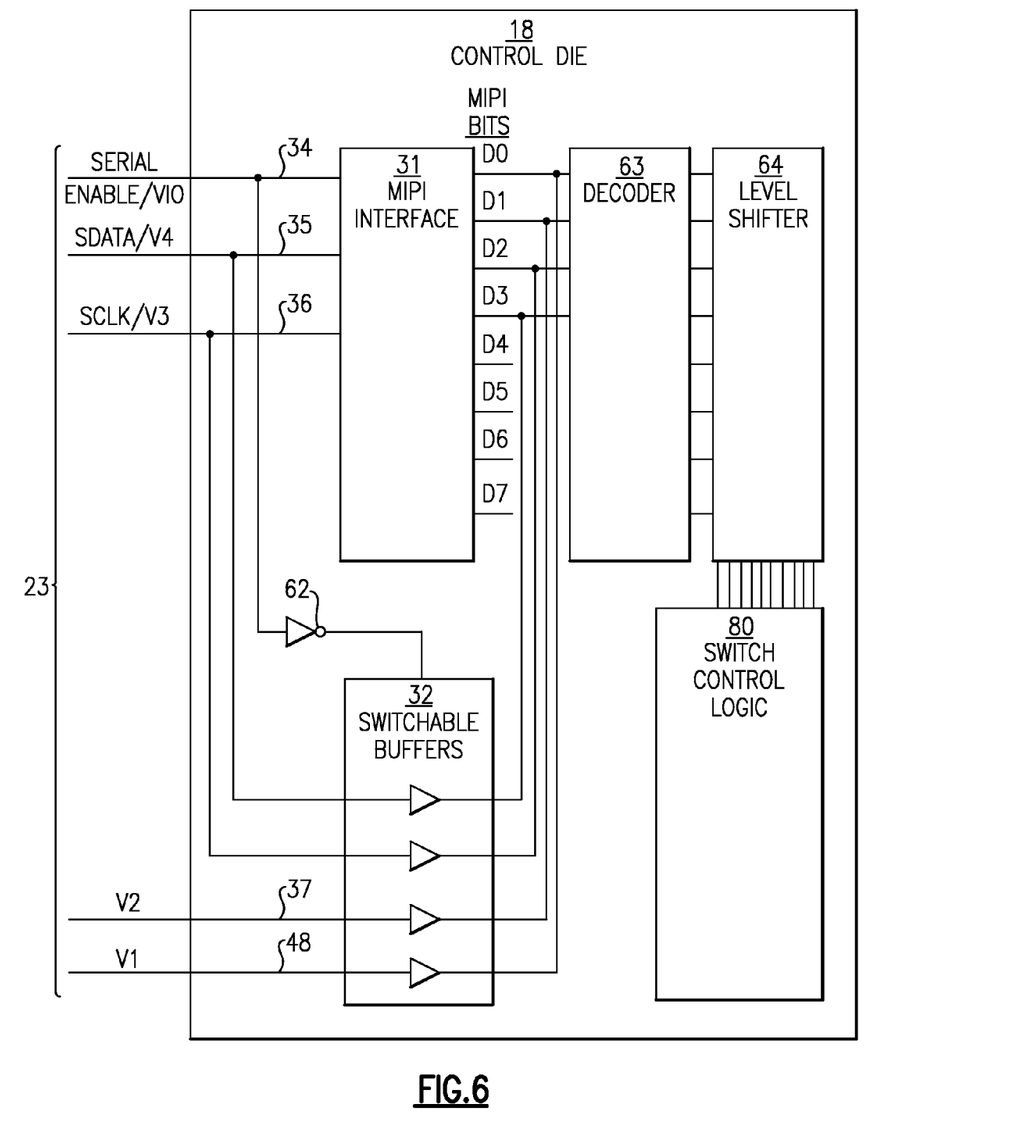
FIG. 6 is a schematic block diagram of a control die, according to an embodiment.

FIG. 6 is a schematic block diagram of the control die 18, according to an embodiment. As discussed above, the dual-mode serial interface 31 and parallel interface 32 can be provided to other components of the wireless device 11. In the illustrated embodiment, the v includes a Mobile Industry Processor Interface (MIPI/SPI) 31, parallel switchable buffers 32, an inverter 62, a decoder 63, a level shifter 64, and switch control logic 80. The level shifter 64 can provide serial or parallel data, received externally, to the switch control logic 80. The switch control logic 80 can, for example, determine how to control the switching component 12, and send serial or parallel data via the serial/parallel data bus 23. The control die 18 can receive signals (for example, from the processor 20), via the parallel/serial interface bus 23. As shown, the parallel/serial interface bus 23 can be configured as either a parallel or serial bus, depending on how the inputs 34-37 and 48 are connected external to the control die 18.

Figure 7:
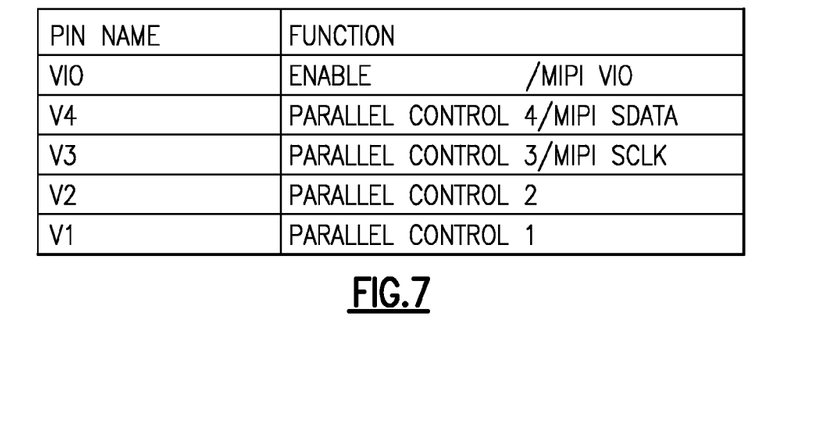
FIG. 7 is a table illustrating a pin mapping for the electronic system of FIG. 6, according to an embodiment.

FIG. 7 is a table illustrating a pin mapping for the switching component die 30 of FIG. 6, according to an embodiment. As shown in FIG. 7, the parallel control signal VIO acts as an active-low enable signal for the parallel switchable buffers 32. Accordingly, the parallel switchable buffers 32 can enter a high-impedance state when the signal VIO is high. Furthermore, the parallel control signals V1 through V4 can act as parallel control signals 1 through 4, as described above with respect to FIG. 6.

Figure 8:
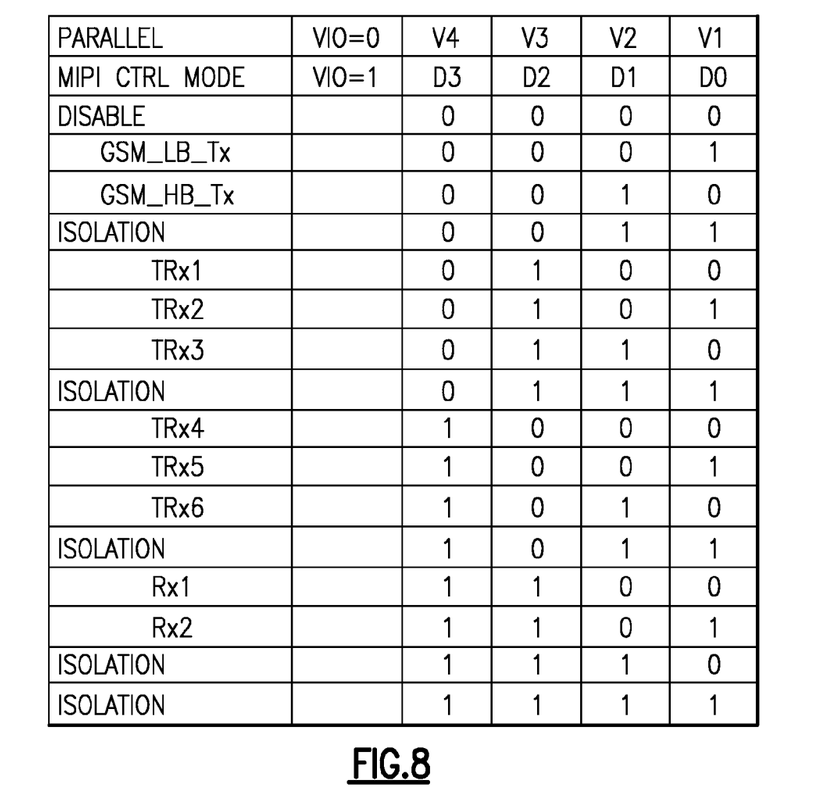
FIG. 8 is a table illustrating a control scheme for the electronic system of FIG. 6, according to an embodiment.

FIG. 8 is a table illustrating a control scheme for the switching component die 30 of FIG. 6, according to an embodiment. As shown in FIG. 8, the parallel control signals D0 through D3 indicate various RF switch commands.

Applications

Some of the embodiments described above have provided examples in connection with mobile phones. However, the principles and advantages of the embodiments can be used for any other systems or apparatus that have needs for serial and/or parallel interfaces.

Such dual serial/parallel interfaces can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A dual interface device comprising a die and a package encasing the die, the package including pins configured to receive data, and the die including:
    a plurality of signal pins;
    a serial interface including a serial input electrically coupled to at least one pin of the plurality of signal pins;
    a parallel interface including a parallel data input electrically coupled to the at least one pin of the plurality of signal pins while the serial input of serial interface is electrically coupled to the at least one pin of the signal pins, the parallel data input being electrically coupled to a pin of the pins of the package, the parallel interface including a second parallel data input that is not electrically coupled to any of the pins of the package, the parallel interface configured to operate in a high-impedance output mode when the serial interface is enabled;
    a controller configured to provide a level shifted voltage signal to a radio frequency switch; and
    a bus electrically connecting both the serial interface and the parallel interface to the controller, at least one of the serial interface or the parallel interface configured to provide data from the at least one pin of the plurality of signal pins to the controller via the bus.

2. The dual interface device of claim 1 wherein the device is configured such that only the serial interface can be enabled.

3. The dual interface device of claim 2 wherein the serial interface is configured to provide a high-impedance output when not enabled.

4. The dual interface device of claim 1 wherein the parallel interface includes a tri-state buffer configured to buffer a signal received at the parallel data input to the parallel interface and provide a buffered version of the signal received at the parallel data input to the bus when enabled, the tri-state buffer configured to provide a high-impedance output to the bus when the serial interface is enabled.

5. The dual interface device of claim 4 further comprising an inverter configured to receive a serial enable signal and to output a parallel disable signal, the parallel disable signal configured to disable the parallel interface when active.

6. The dual interface device of claim 1 wherein the serial interface is configured to implement a serial peripheral interface (SPI).

7. The dual interface device of claim 1 wherein the serial interface includes a serial enable input, a serial data input, and a serial clock input; the serial input being one of the serial enable input, the serial data input, or the serial clock input.

8. The dual interface device of claim 7 wherein the serial interface is configured to implement a mobile industry processor interface (MIPI/SPI).

9. The dual interface device of claim 1 wherein the parallel interface is configured to implement a parallel general purpose input-output (GPIO) interface.

10. The dual interface device of claim 1 wherein the die further includes the radio frequency switch.

11. A wireless switching component comprising:
    a plurality of signal pins;
    a serial interface including a serial input electrically coupled to a pin of the plurality of signal pins;
    a parallel interface including a parallel data input electrically coupled to the pin of the plurality of signal pins, the parallel interface further including a switchable buffer configured to provide a buffered version of a signal received at the parallel data input when active and to provide a high impedance output when not-active, the wireless switching component arranged such that one of the serial interface or the parallel interface cannot be enabled;
    a decoder electrically coupled to an output of the serial interface and an output of the parallel interface; and
    a level shifter electrically coupled between the decoder and a radio-frequency switch, the level shifter configured to adjust a voltage level of a signal provided to the radio-frequency switch.

12. The wireless switching component of claim 11 wherein a second pin of the plurality of signal pins is electrically coupled to both a second serial input of the serial interface and a second parallel data input of the parallel interface.

13. The wireless switching component of claim 11 wherein the decoder is configured to receive data from the parallel interface and the serial interface is configured to concurrently provide a high impedance output.

14. The wireless switching component of claim 11 wherein the serial interface cannot be enabled.

15. The wireless switching component of claim 14 wherein the serial interface has an enable input that is electrically coupled to a substantially constant potential to disable the serial interface.

16. The wireless switching component of claim 14 wherein the serial interface has an enable input that has a fixed electrical connection to ground to disable the serial interface.

17. The wireless switching component of claim 11 wherein the parallel interface cannot be enabled.

18. The wireless switching component of claim 17 further comprising a package encasing a die on which the parallel interface and the serial interface are implemented, the package including pins, and the parallel interface further including a second parallel data input that is not electrically coupled to any pins of the package.

19. The wireless switching component of claim 11 wherein the parallel interface, the serial interface, the decoder, and the level shifter are embodied on a single die.

20. A wireless device comprising:
a transceiver configured to output a plurality of transmission paths;
an antenna configured to output a signal corresponding to at least one of the transmission paths; and
a wireless switching component including a radio-frequency switch configured to selectively connect the antenna to one of the transmission paths, a plurality of signal pins, a serial interface including a serial input electrically coupled to a pin of the plurality of signal pins, a parallel interface including a parallel data input electrically coupled to the pin of the plurality of signal pins, a second parallel data input, and switchable buffers configured to provide a high impedance output when the serial interface is enabled; a decoder electrically coupled to both the serial interface and the parallel interface by a common bus; a level shifter electrically coupled between the decoder and the radio frequency switch; and a package encasing at least the serial interface, the parallel interface, the decoder, and the level shifter, the package including pins configured to receive data, and the second parallel data input not being electrically coupled to any of the pins of the package.

21. The wireless device of claim 20 wherein the device is configured such that only the serial interface can be enabled.

22. The wireless device of claim 20 wherein a second pin of the plurality of signal pins is electrically coupled to both a second serial input of the serial interface and a third parallel data input of the parallel interface.

* * * * *